2,791,262
Patented May 7, 1957

2,791,262
SIZED MICA PAPER AND PROCESS OF PREPARING THE SAME

Frederick Budnik, Schenectady, N. Y., assignor to Mica Insulator Company, Schenectady, N. Y., a corporation of New Jersey No Drawing. Application August 29, 1952, Serial No. 307,171

7 Claims. (Cl. 154—2.6)

The present invention relates to products in sheet or paper form composed primarily of mica and comprises a novel product of this type which is superior in many respects to mica products heretofore produced. The new mica paper has relatively great strength, both dry and wet, thus facilitating handling. It has good water resistance and may be readily punched. The invention includes also the new process for preparing the improved mica product.

The new product is prepared from particles of mica sufficiently small to go into suspension in an aqueous medium when immersed and agitated therein. Although any suitable process may be employed for reducing micaceous material to a pulp of fine particles of mica usable as the starting material for the new mica product, the process described in Bardet U. S. Patent No. 2,549,880 has been found particularly suitable. That process comprises partially dehydrating micaceous material by heat treatment at about 800° C., followed by treatment in a liquid medium to sub-divide the heat-treated mica into thin finely divided particles. After the liquid is drained from the mica particles there is formed a pulp of pure mica which can easily enter into suspension in an aqueous medium. Pulp of this type may be combined with water and a paper of pure mica produced by hand methods or by use of conventional paper making machinery. In accordance with the present invention an improved product is obtained from pulp of the above described type by depositing an adhesive form of silica on the mica particles at any convenient stage in the manufacture of mica paper therefrom. The silica may be deposited from a colloidal silica suspension or from a solution containing hydrolyzed silicic acid esters or from any other solution containing silica in a form dispersible in mica pulp. Preferably the silica is deposited on the mica from a solution containing hydrolyzed ethyl silicate.

When ethyl silicate, that is, ethyl orthosilicate or ethyl polysilicate, or mixtures thereof, reacts with water, silicic acid and ethyl alcohol are produced. The acid in turn dehydrates to the adhesive form of silica which deposits when the water and alcohol are removed by evaporation. As the silicate is not readily miscible with water, a coupling agent such as ethyl alcohol is ordinarily employed in the preparation of the hydrolyzing solution and, as hydrolysis occurs slowly in a neutral solution, the solution is preferably acidified by addition of acid to the water. A hydrolyzing solution useful in the practice of the present invention may comprise—

| | Parts by volume |
|---|---|
| Tetraethyl orthosilicate | 37 |
| Ethanol (denatured) | 12 |
| 10% acetic acid | 1 |

This solution after preparation should stand at least 24 hours, after which time 100 parts of the solution is diluted with 7 parts of water. This diluted solution is then allowed to stand for at least 24 hours before use.

Another hydrolyzing solution suitable for use in the practice of the invention is the following—

| | Parts by volume |
|---|---|
| Condensed ethyl silicate (being predominantly ethyl orthosilicate but mixed with some ethyl polysilicate) | 40 |
| Ethanol (190 proof, denatured) | 9 |
| 5% acetic acid | 1 |
| Water | 4 |

The water in the above formula should be added not less than twenty-four hours after the ethyl silicate, alcohol and acid have been mixed in order to allow for partial hydrolysis of the ester.

Another hydroyzing solution suitable for use in the practice of the invention is the following—

| | Parts by volume |
|---|---|
| Condensed ethyl silicate | 100 |
| 45% formic acid (agitate for twenty minutes and then add water) | 20 |
| Water | 100 |

In the following description of specific examples illustrative of the process of the invention and of the products resulting therefrom, the hydrolyzing solutions referred to therein may be any of the above described compositions or may be any known hydrolyzing solution of silicate ester provided it does not contain non-volatile components which might impair the physical or electrical properties of the mica paper.

Example I

A quantity of dry mica pulp is placed on a tray having a removable wire mesh base and the tray lowered into a vessel the walls of which conform to the dimensions of the tray. Water is introduced into the vessel and the mica pulp agitated in the water to disintegrate the pulp into mica particles which go into suspension in the water. A hydrolyzing solution of ethyl orthosilicate such as previously described is then introduced into the vessel in the proportion of one part by volume of solution to one part of the mica suspension. After stirring, to distribute the mica uniformly throughout the liquid, a sheet of paper of the dimensions of the tray is floated on the surface of the liquid and then the liquid in the vessel is drawn off through an outlet in the vessel beneath the tray. The mesh base of the tray carrying mica particles strained from the liquid and the overlying paper sheet is then placed on a heated plate the temperature of which is maintained at or below 100° C. until the mica and cover sheet are dry. The cover sheet is then stripped from the mica and the temperature of the plate raised to above 250° C. to remove remaining organic material. Upon removal from the plate, mica particles which have combined to form a coherent sheet, can be readily removed from the wire mesh base. Interspersed with the mica particles and serving to augment their cohesion is silica deposited from the hydrolyzed solution of the silicate, the percentage of silica in the final product being between 1% and 25%. The silica strengthens the paper and increases its water resistance. The sheet can be readily punched and if sufficient mica has been used to make a sheet having a thickness of 15 mils or more, it is strong enough for use, for example, as spacers and supports for electrodes of electronic tubes, or for heater plates, or the like.

Example II

Mica pulp is processed on conventional paper making machinery. After the mica web has been removed from the wire and partially dried, it is passed through a hydrolyzing solution of ethyl silicate. It is then dried and finally heated at a temperature above 250° C. to remove organic residue of the solution. The physical characteristics of the resulting sized mica paper is similar to the product produced by the batch process of Example I.

*Example III*

Mica pulp is processed on conventional paper making machinery. After most of the water has been removed from the mica web a suspension of colloidal silica is sprayed or applied in other suitable manner to the web. The web is then dried and heated as in Example II, resulting in a silica sized mica paper similar to that of Examples I and II.

*Example IV*

Previously prepared mica paper is heated to 540° C. for sufficient time to remove any organic sizing thereon, then immersed in a hydrolyzing solution of silicate ester, removed from the solution, heated at about 100° C. for one-half hour or until thoroughly dried, and then heated at about 250° C. for one hour.

The new mica product has now been described and examples illustrative of the method of preparing the new product have been given. The new paper may be used alone, for example as an insulating spacer, as heater plate, or the like, or sheets of the paper may be cemented together or with other materials such as glass fabric, asbestos, or the like to form laminated products of greater thickness. The addition of the silica to the mica paper facilitates the manufacture of such laminated products, as the wet strength of the silica sized mica paper is high when treated with agents such as silicone resins, shellac or the like ordinarily employed in building laminated products.

The following is claimed:

1. A method for improving the physical characteristics of products of sheet form composed substantially entirely of mica and produced from a mica pulp dispersed in water, which comprises depositing an adhesive form of silica from a hydrolyzing solution of silicate ester on the mica during one stage in the production of the mica product.

2. In the process of making products of sheet form composed substantially entirely of mica which comprises dispersing a mica pulp in an aqueous medium, draining the medium from the mica, and then heating to dry the mica, and to produce a self-sustaining sheet, the improvement which comprises introducing a hydrolyzing solution of silicate ester into the aqueous medium to deposit an adhesive form of silica upon the mica upon drying and evaporation of organic material of the solution.

3. A process for improving the physical characteristics of products of sheet form composed substantially entirely of mica and produced from a mica pulp dispersible in water which comprises submerging the mica product in a hydrolyzing solution of ethyl silicate to receive a deposit of adhesive silica from the solution, then drying the product and removing the volatile organic materials of the hydrolyzing solution by heat to leave a sheet-like product consisting of mica reinforced by silica.

4. The process according to claim 3 wherein the product is dried at a temperature of about 100° C. and then heated to a temperature of above 250° C.

5. A sheet-like product consisting of mica particles and silica, the percentage of silica in the product being between one and twenty-five.

6. A sheet-like product consisting of mica particles and silica deposited thereon from a hydrolyzing solution of silicate ester.

7. Mica paper sized with unfused silica.

References Cited in the file of this patent

UNITED STATES PATENTS

| | | |
|---|---|---|
| 2,136,877 | Delpech et al. | Nov. 15, 1938 |
| 2,258,218 | Rochow | Oct. 7, 1941 |
| 2,456,251 | Boughton et al. | Dec. 14, 1948 |
| 2,493,694 | Shepard | Jan. 3, 1950 |
| 2,549,880 | Bardet | Apr. 24, 1951 |
| 2,559,791 | Peyrot et al. | July 10, 1951 |
| 2,614,055 | De Senarclens | Oct. 14, 1952 |